Figure 3:
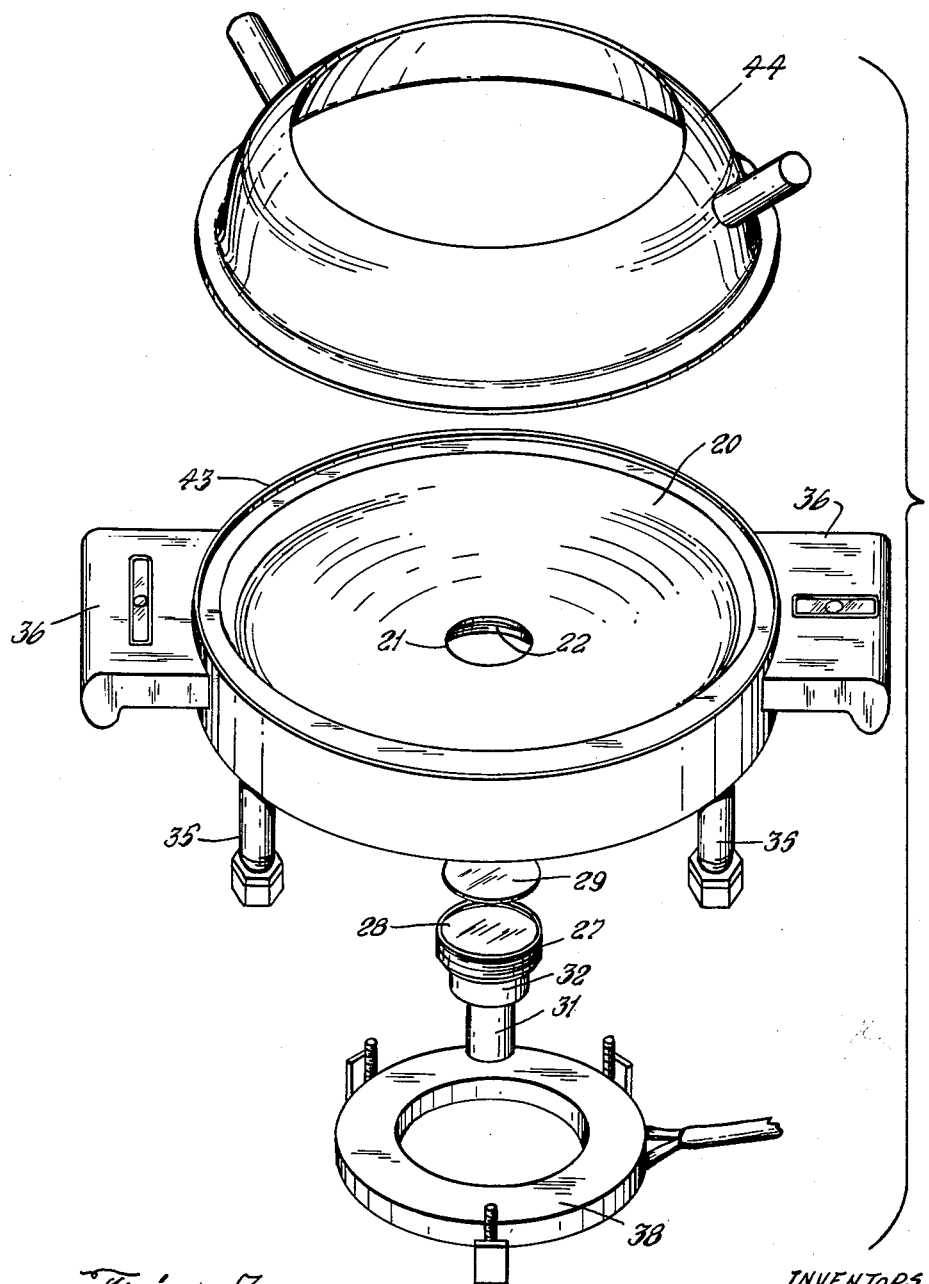

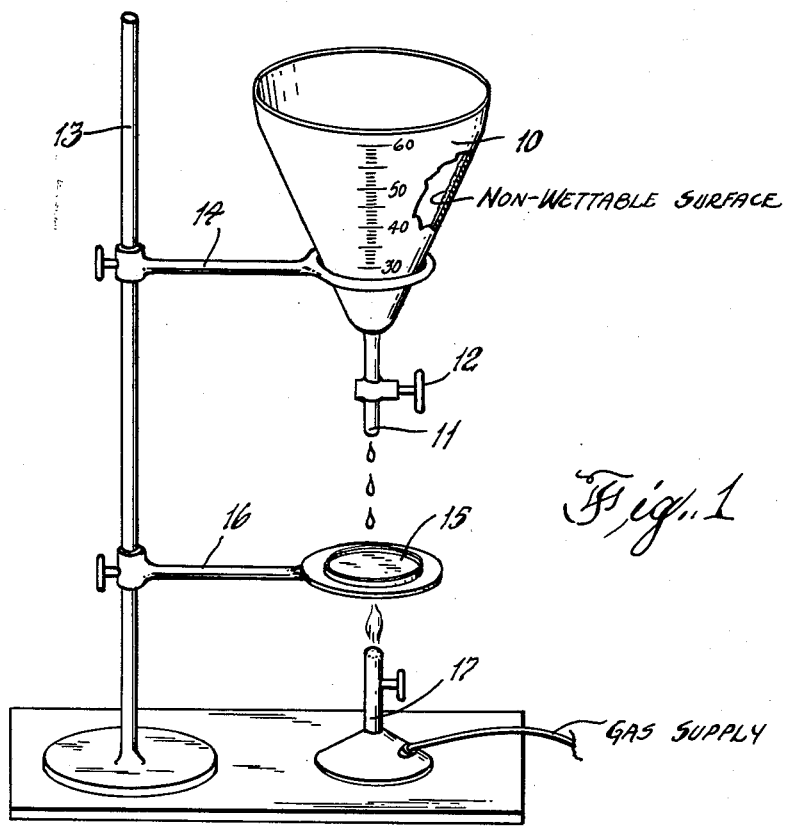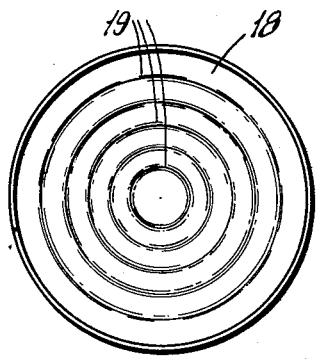

INVENTORS.
RALPH C. MAGGIO
CHARLES CHRISTIANSON

BY Arthur L. Bowers
AGENT

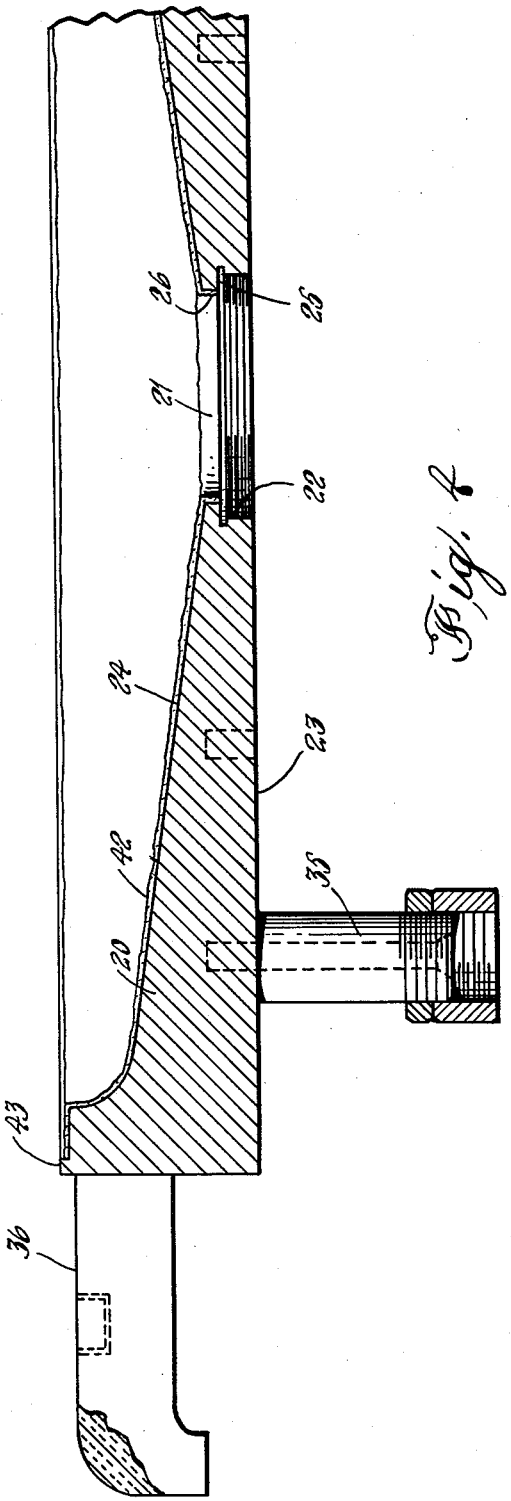
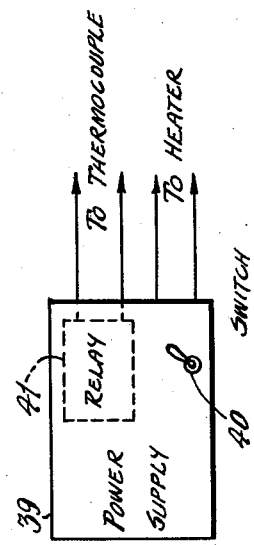
Fig. 4
Fig. 6
INVENTORS.
RALPH C. MAGGIO
CHARLES CHRISTIANSON
BY Arthur L. Bowers
AGENT Oct. 29, 1963  R. C. MAGGIO ETAL  3,109,099
EVAPORATION AND CONCENTRATION UNIT FOR DILUTE
RADIOACTIVE AND NON-RADIOACTIVE SOLUTIONS
Filed March 23, 1961  4 Sheets-Sheet 4

INVENTORS.
RALPH C. MAGGIO
CHARLES CHRISTIANSON

BY Arthur L. Bowers
AGENT

United States Patent Office 3,109,099
Patented Oct. 29, 1963

3,109,099
EVAPORATION AND CONCENTRATION UNIT FOR DILUTE RADIOACTIVE AND NON-RADIOACTIVE SOLUTIONS
Ralph C. Maggio, Fort Lee, N.J., and Charles Christianson, New York, N.Y., assignors to the United States of America as represented by the Secretary of the Navy
Filed Mar. 23, 1961, Ser. No. 97,978
11 Claims. (Cl. 250—106)
(Granted under Title 35, U.S. Code (1952), sec. 266)

The invention described herein may be manufactured and used by or for the Government of the United States of America for governmental purposes without the payment of any royalties thereon or therefor.

This invention relates to measuring the level of radioactivity in a liquid particularly water. Programs have been put into effect for detecting and monitoring the level of radioactivity in rain water, boiler water of nuclear power plants, harbor water, and drinking water supplies particularly in the vicinity of nuclear power plants, for protecting health and safety, for detecting malfunction of nuclear equipment, for detecting clandestine nuclear activity, for collecting scientific data for reference purposes, and for a host of other reasons. To date, methods and apparatus employed in these programs have been cumbersome, inaccurate, slow, expensive, and generally unsatisfactory.

Radioactivity in the water sources mentioned is carried substantially entirely by a fraction of the solid matter in suspension or in solution in the water, or both. There is negligible radioactivity in the water molecules. The solid matter in the water sources mentioned generally is low, less than one percent. If there is radioactivity present in the water, only a small fraction of said small fraction of the solid matter in the water is responsible. If the radioactivity were gamma radiation, it might be possible to make coarse radiation measurements directly on a sample of the water because of the great penetrating power of gamma radiation. However, if the radioactivity is alpha or beta radiation it is not possible to measure the radioactivity directly because the penetrating power of these radiations is not near as great as the penetrating power of gamma radiation. Water and most liquids considerably attenuate alpha and beta radiation originating in solid matter in the water even slightly below the water surface. A major aspect of this problem is to measure radioactive contamination in water and other vaporizable liquids which may be an order of magnitude as low as $10^{-12}$ curies per cubic centimeter where the radioactivity is alpha or beta radiation and where solid matter in the liquid, and not the liquid, per se, originates the radiation.

On nuclear ships, particularly nuclear submarines, it is essential to monitor drinking water and boiler water at regular intervals for morale as well as for safety. Rise in radioactivity in the boiler water indicates malfunction in the power plant, or may be due to neutron bombardment of impurities. Impurities may become excessive despite careful control of salinity, pH chemistry, etc. Also, if coolant water which may contain radioactive contaminants is discharged into the sea and if sea water is drawn in by the fresh water distillation system at substantially the same time, or in substantially the same location, the fresh water supply may be contaminated with radioactivity. However, regardless of the process by which radioactive contaminants find their way into the water supplies, it is essential that they be monitored at regular and frequent intervals.

In the course of prior monitoring procedures, attempts have been made to separate the distributed solid matter from the water preparatory to making alpha or beta radiation measurements but those attempts have not been satisfactory. In one method, the solid matter is deposited as a film over substantially the entire container surface. Where the radioactive contaminants are present in trace concentration, a substantial quantity of water is needed in order to deposit a significant quantity of the contaminant. Therefore the container and its surface on which the film is deposited is too large for viewing by the sensing window of a Geiger-Muller instrument. Measurements produced little more than crude estimates. Later, attempts were made to scrape and collect the deposited film material onto an area corresponding to the window area of the measuring instrument. Since all of the film deposited material could not possibly be gathered, and since some container material was scraped from the container wall and added to the sample, and since the compacting and geometry of the gathered together scrapings was crude, results were obviously inaccurate, as well as expensive and cumbersome. In the foregoing procedures, after a container has come in contact with the radioactive solution, it is in a contaminated condition and before reuse it must be thoroughly cleaned and examined which in itself is time consuming and tedious. The repeated residues of washing materials deposited by successive washings introduce inaccuracy in measurements carried out by the foregoing procedures. In addition, the liquid sample taken is substantially larger than might otherwise be required to compensate for the estimated non-recoverable percentage of deposited film of solid matter. However, because of larger liquid samples, the time required for the procedures is lengthened. Ideally, it is desirable to obtain a quantitative reading of radioactivity, immediately e.g. just as a voltmeter is capable of measuring voltage in an electrical circuit immediately. Since instantaneous measurement is not possible, it is desirable to minimize the time lag between sampling the liquid and reading the radioactivity therein.

An object of this invention is to provide a practical and accurate apparatus and method for measuring radioactivity particularly alpha and/or beta radiation in water supplies. A further object is to accomplish this for radioactivity as low as the order of $10^{-12}$ curies per cubic centimeter.

A further object is to extract solid matter from a water sample throughout which it is distributed as a solute or in suspension, particularly where present in trace quantity and to uniformly deposit the solid matter on a selected surface of selected geometry which is small compared to the area required for confining the liquid and small enough to be the objective of a Geiger-Muller measuring instrument, so that accurate radiation measurments may be made on the solid matter in the water.

A further object is to provide apparatus and method as described above which may be used by scientifically untrained personnel and which is comparatively foolproof.

A further object is to provide an improved method and apparatus for concentrating and examining the solids content in a vaporizable liquid.

A further object is to provide a method of concentrating the solids content in a vaporizable liquid when the solids content may be radioactive and where the liquid is not radioactive, per se, and then measuring the radioactivity of the solids content.

Figure 5:
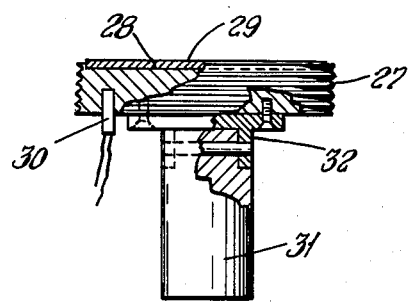
Figure 7:
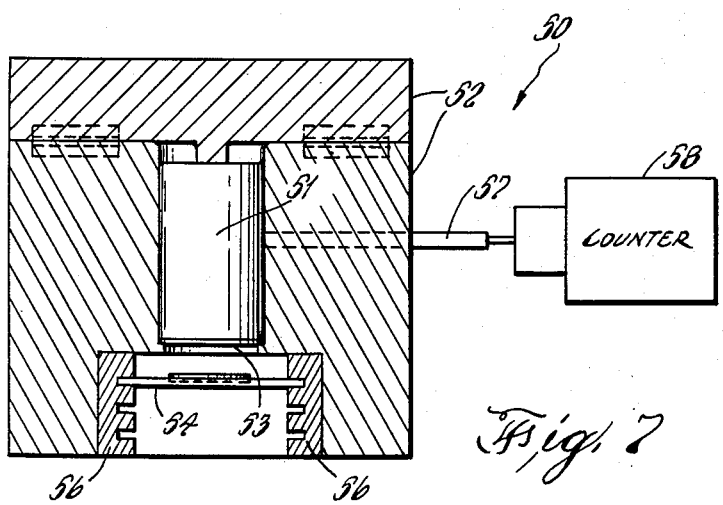
Figure 7A:
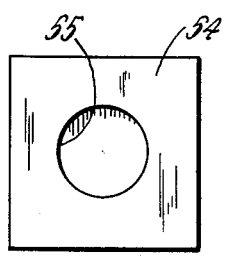

Other objects and many of the attendant advantages of this invention will be readily appreciated as the same becomes better understood by reference to the following detailed description when considered in connection with the accompanying drawings wherein:

FIG. 1 illustrates a method and apparatus for separating out onto a planar planchet solid matter contained in a measured quantity of a vaporizable liquid, FIG. 2 is a plan view of another type of planchet for use in this invention having concentric grooves or recesses for improved distribution of material deposited thereon, FIG. 3 is an exploded view of another embodiment of the invention, FIG. 4 is a cross-section of the evaporator dish shown in FIG. 3 including detail absent in FIG. 3, FIG. 5 is a cross-section of the plug shown in FIG. 3 showing details, FIG. 6 is a simplified block diagram of heater power supply for the embodiment shown in FIG. 3 to show that the power supply includes a relay operable by a thermocouple for shutting off the power supply, FIG. 7 illustrates a radioactivity measuring equipment where the specimen is on a planchet, and FIG. 7a is a plan view of a shelf for seating a planchet and for accurately locating the planchet in the measuring equipment shown in FIG. 7.

In its broader aspects this invention is for a method of concentrating, examining and conducting precise measurements including radioactivity measurements on the solids content distributed in a measured liquid sample by confining the liquid sample with a surface that is substantially non-wettable by the liquid, progressively directing all the liquid and all the solids of the measured sample toward a surface which is small compared to the sample confining surface, and preferably separate or separable therefrom, and during such direction progressively evaporating the liquid until all the solids are concentrated and dry on the small surface and then subjecting the deposited solids to examination and precise measurements.

In FIG. 1 there is shown one apparatus for carrying out the described method. A container 10 is shown for a measured quantity of liquid and having a spout 11 and a spigot 12 for opening and closing the spout. The spout and spigot are capable of controlling the flow of liquid therethrough to pass one drop at a time and at a controlled rate. The liquid confining surface of container 10 is of a material non-wettable by the liquid to be contained therein. For example, the container, spout and spigot may be formed from tetrafluoroethylene resin marketed under the name Teflon, a registered trademark of the Dupont Co. of Wilmington, Delaware, or of a fluorocarbon polymer dispersion marketed under the name of Kel-F, a registered trademark of M. W. Kellogg Co. Alternatively the container 10 may be of glass and the liquid confining surfaces of container 10 may be coated with a non-wettable material such as Teflon, Kel-F or even paraffin. Teflon is described in several Dupont bulletins; one is entitled Dupont Teflon, made available by the Polychemicals Department and copyright 1954; another bulletin is new Product Technical Bulletin #1 made available by the Fabrics and Finishes Department, Finishes Division, Dupont Co. Kel-F is described in a bulletin entitled Application Techniques For Kel-F Fluorocarbon Polymer Dispersions.

The container 10 is supported on a stand 13 by an adjustable clamp 14. A planchet 15 having slightly raised rim is supported by an adjustable clamp 16 on the same stand below the spout 11 for intercepting liquid droplets from the spout as shown in FIG. 1. A Bunsen burner 17 is supported on the base of the stand for heating the planchet to vaporize any liquid on the planchet. The geometry of the planchet is selected to correspond to the window of a Geiger-Muller instrument. The planchets may be circular and on the order of one inch diameter. The method illustrated in FIG. 1 requires the services of a skilled laboratory technician to avoid loss of some of the sample by splashing or overflow from the planchet and to avoid undesirable effects of excessively heating the deposited solid matter and vaporizing some of the deposited solids.

The reading of radioactivity from solid matter deposited on the planchet is affected by the distribution of the deposited solid matter. In FIG. 2 there is shown a planchet 18 having concentric grooves 19 for obtaining a satisfactory distribution of deposited solid matter.

Another apparatus for carrying out the method, disclosed in the succeeding figures, includes a shallow saucer-like or dished container 20, of Teflon or Kel-F. However, a metal container is preferable for greater durability, resistance to dents, better heat conductivity, and easier to fabricate. A bore 21 is formed through the center of the dish. A major portion 22 of the length of the bore extending from the outside surface 23 of the container toward the dished inner surface 24 is of enlarged diameter and undercut at the inner end and defines a flat shoulder 25 substantially normal to the axis of the bore to close tolerance, and a lip 26 contiguous with the dished surface 24 of the container. The enlarged diameter portion 22 of the bore is formed with fine threads, between the outer surface 13 and the undercut. The dished surface 24 is free of dents and is substantially smooth and convergent to the axis of bore 21 from the outer edge of the dished surface 24 and the rim of the lip 26 of the bore. The container is shallow with large dished surface area for accelerating evaporation of liquid contained therein. A solid metal threaded plug 27 is provided for assembly in the bore 21. One end of the plug 27 is formed with a shallow recess 28 for seating a snug fitting thin flat planchet 29 of a thickness exceeding the depth of the recess somewhat, in order that the planchet be readily removable from the recess 28. A thermocouple 30 is secured in a recess in the opposite end of the plug for generating a signal voltage related to the temperature of the plug. A short handle 31 is secured to the opposed end of the plug by means of a mounting collar 32. When the planchet 29 is assembled in the recess 28 of the plug 27 and the plug assembled into the bore 21 and tightened against the shoulder 25, the bore 21 is substantially sealed against passage of liquid.

Three support legs 35 are secured to the outer surface of the container and are of sufficient length to enable the plug handle 31 to clear a supporting surface. Each of the legs 35 is of adjustable length for leveling the container. Handles 36 of heat insulating material are secured to the container to extend laterally. Level indicators 37 are mounted in the handles and oriented on the handles so that when the bubbles are centered the axis of the container is vertical. When the unit is seated on a support surface, lengths of the legs are adjusted to center the bubbles. The container is designed to retain a selected volume of liquid, e.g. one liter in order to obtain enough solid matter for carrying out measurements.

An electric heater unit 38 is secured to the outer surface of the container. An electric power source 39, FIG. 6, in series with a switch 40 is connected to the heater unit. A relay 41 capable of deenergizing the power supply is connected to the thermocouple and turns off the power supply when the temperature sensed by the thermocouple exceeds a predetermined temperature to prevent change in the deposited solid matter after the liquid is completely evaporated. When the unit is attended, in use, the thermocouple and relay may be omitted.

When readied for use, the container and plug are checked for radioactivity and cleansed if any is present. Then assuming the container is of metal, a coating 42 of silicone grease free of radioactive contaminants is applied manually to the dished surface 24 of the container, the shoulder 25, and the lip 26 of the bore 21. Then a planchet, of aluminum or other suitable material, free of radioactivity, and of substantially the same diameter as the recess, is seated in the plug recess 28. A central portion of one face of the planchet is masked with tape leaving the non-masked area exposed. Then a silicone grease coating is applied to the planchet surface, the mask removed and the plug assembled in the bore and tightened in place. The unit is leveled and a measured sample quantity of the selected liquid, whose solid content is to be examined, measured and the like, is poured into the container. Preferably container size is selected so that the measured quantity of liquid substantially fills the container. The electrical power supply is connected to the heater to heat and progressively evaporate the liquid. The power supplied to the heater is less than that which would cause boiling to prevent driving off some of the liquid in the form of droplets. As evaporation continues the liquid level recedes but does not wet the greased surface and therefore does not deposit any solid matter on the greased surface. Finally all the water remaining in the container is on the surface of the plug and with further heating, the solid matter originally in the measured sample is deposited dry in the central ungreased area of the planchet. Then the heater is turned off to prevent change or evaporization of the deposited solids. The purpose of the thermocouple is to shut off the heat automatically when the unit is unattended. The planchet with the substantially uniformly distributed layer of deposited solids is removed to a radioactivity measuring instrument and the radioactivity measured. Also, deposited solids may be subjected to quantitative analysis. Tests performed on the apparatus using water samples prepared with measured quantities of radioactive solids in the water have demonstrated that substantially no solids are deposited on the greased surface. However, it was learned that the silicone grease should be thoroughly cleaned and a new grease coating applied after one to three uses depending on circumstances.

As an alternative to applying the silicone grease directly to the dished surface, which is somewhat troublesome to remove prior to applying a new coating, a thin plastic sheet may first be placed against the container surface and the grease applied to the exposed surface of the sheet. This method simplifies removal of the grease. The selected plastic sheet should have good temperature stability to resist the anticipated elevated temperatures and preferably be impervious and unaffected by either the grease or the solution to be placed in the container. One example of a suitable sheet material is a polymerized vinylidene chloride marketed under the trade name Saran by Dow Chemical Company.

On board ship, liquid may slosh over the edge of the dish rendering the measurement inaccurate. To overcome this problem, the edge of the dished container is formed with a lip 43, a slosh shield 44 for preventing loss of some of the liquid sample is seated on the edge of the container within the lip 43. The shield may be made of one of the non-wettable materials or otherwise may be coated with silicone grease to prevent adherence of moisture on the inner surface thereof. The edge of the slosh shield engaging the container is likewise coated with grease to prevent loss of liquid between the cover and the edge of the container.

In environments where settling dust may interfere with accuracy of measurements, it is necessary to increase the depth of the container to reduce the size of exposed surface, and at the price of increased evaporation time.

An advantage of silicone grease over the other non-wetting materials is that it has better temperature stability above 500° F. The latter may be applied as sprayed on coatings.

A radiation measuring instrument does not see the same amount of radioactivity during a measurement on a predetermined quantity of a pure radioactive substance as when the same quantity of the same pure radioactive substance is mixed with other non-active materials. The difference in readings varies with the nature and quantity of the other non-active materials mixed with the radioactive substance. Therefore to obtain more accurate and meaningful measurements in measuring radioactive contamination in a water supply using apparatus and methods that are the same or equivalent of those described above, it is necessary to develop a calibration chart or graph for the known radioactive contaminant or when the contaminant is not known, an asumed contaminant representative of the worst that might be encountered in that water supply. A radioactivity measuring instrument is selected. A carefully weighed sample quantity of the radioactive contaminant in pure state and powder form is substantially uniformly distributed over the surface of a planchet. The geometry of the planchet is selected to correspond to the window of the measuring instrument. After a reading of radioactivity of the pure sample is recorded, the sample or a duplicate sample is dissolved or distributed in a measured sample quantity of water to be monitored, preferably free of radioactive contamination. The water is evaporated as described previously to uniformly deposit dry all the solid matter therein including the added radioactive sample on a duplicate planchet. The radioactivity is measured and recorded. The procedure is repeated for several different weights of radioactive contaminant. A calibration curve is plotted from the data thus obtained.

In FIG. 7 there is illustrated a radioactivity measuring equipment 50 designed for planchets. Broadly it includes a Geiger-Mueller tube 51 supported in a lead shield 52 having a lead door (not shown). The downwardly directed exposed face 53 of the tube is the window area for passing radioactivity into the tube. A shelf 54 formed with a recess 55 designed to seat the planchet is slidably inserted into a shelf-mounting 56 having several mounting positions for accurately locating the planchet at one of several selected distances from the Geiger-Mueller tube window, all of which were previously calibrated. An electrical cable 57 connects the tube 51 to a counter 58.

Obviously many modifications and variations of the present invention are possible in the light of the above teachings. It is therefore to be understood that within the scope of the appended claims the invention may be practised otherwise than as specifically described.

We claim:

1. An evaporator dish for separating out substantially all solid matter dissolved in and carried by a vaporizable liquid for depositing substantially all said solid matter, dry, on a compact surface area which is a minor fraction of the inside surface area of the dish, comprising a generally saucer-shaped dish having a central hole extending through the center of the bottom thereof, a removable plug for sealing said hole and for removably supporting a planchet recessed in and extending entirely across said hole, and a substantially continuous coating on the concave surface of said dish which is substantially non-wettable by the liquid, whereby when said plug and planchet are in place and seal the hole and said coating is on said concave surface, and said dish is filled with a known volume of said liquid and the solid matter therein under conditions wherein rapid evaporation of the liquid will occur, as the level of liquid in said dish is progressively lowered by the evaporation of the liquid, substantially no solid matter is deposited on the sides of the dish and when all the liquid is evaporated, substantially all the solid matter contained in the liquid is deposited on the removable planchet facilitating qualitative and/or quantitative examination of the solid matter.

2. An evaporator as defined in claim 1, further comprising means for applying heat to the liquid in said evaporator to accelerate evaporation.

3. A method of measuring radioactive contamination in a water supply comprising isolating a measured sample quantity of the water from the water supply, progressively evaporating the water from the measured quantity till its volume is reduced to a predetermined small percentage of the original sample and while retaining substantially all the solid matter of the original sample in the remaining unevaporated water, continuously directing the decreasing volume of the sample containing substantially all the original solid matter of the sample to a selected compact surface area on a removable planchet, evaporating all the remaining water of the reduced sample while on said planchet, and disposing the planchet in a radioactivity measuring device for measuring the radioactive contamination.

4. An evaporator for depositing substantially all the solid matter included in a measured sample quantity of a liquid onto a specimen holder comprising: a saucer-like container for said measured sample quantity and having a mouth area substantially large than the specimen holder and having a recess within the inside bottom of the container opposite the mouth of the container for snugly recessedly seating the specimen holder, the inside surface area of the saucer between said mouth and the rim of the recess being of a material that is substantially non-wettable by said liquid and being free of any pocket capable of retaining liquid when said saucer is seated mouth upward on a support and a liquid therein recedes toward the bottom, whereby every remanent drop of a measured sample of said liquid introduced into the container including the solid matter dissolved therein is free to converge toward the recess during evaporation of the liquid until only the recess over the specimen holder contains the remanent liquid including substantially all the solid matter of the measured sample an whereby subsequent complete evaporation of the remanent liquid leaves the solid matter of the measured sample deposited on said specimen holder.

5. An evaporator dish for separating out substantially all solid matter dissolved in and distributed in an aqueous solution where the concentration of solid matter is in trace quantity, and for depositing substantially all said solid matter dry and uniformly distributed over a selected surface area of a planchet to enable accurate measurement of radioactivity by nuclear radiation measuring equipment comprising a generally saucer-shaped dish having a central hole extending through the wall thereof at the center of the dish, the hole size being stepped from a first diameter at the inner surface of the dish less than the planchet diameter to a diameter larger than the planchet diameter, and defining a shoulder therebetween for said planchet to seat against, the larger diameter portion of the hole being threaded, a flat planchet seated against said shoulder, a threaded plug assembled with said threaded portion of the hole and firmly seating said planchet against said shoulder for sealing the hole, level indicator means on said dish for indicating whether or not said planchet firmly seated against said shoulder is level, level adjustable support means for said dish, a continuous coating non-wettable by said aqueous solution on the inner surface of said dish between the outer rim thereof up to and including said shoulder, the coated inner surface of said dish sloping and converging continuously toward said hole when the dish is level, and means for hastening evaporation of water from the dish.

6. The method of concentrating on a planchet and examining the solids content distributed in a liquid that can be evaporated and which is many times the volume that can be borne by the planchet, which comprises progressively directing toward the planchet a measured quantity of the liquid, with a confining surface substantially non-wettable by said liquid, and during such direction progressively evaporating the liquid until the solids are concentrated and dry on said planchet, and then subjecting the deposited solids to examination.

7. The method of concentrating on a planchet and examining the solids content distributed in a liquid that can be evaporated and which is many times the volume that can be borne by the planchet, comprising confining a measured quantity of the liquid by a non-wettable surface, continuously directing all the confined liquid toward the planchet, progressively evaporating the liquid until all the liquid is evaporated and all the solids contained by said measured quantity are concentrated on said planchet.

8. Apparatus for use in examining the solids content carried in a liquid in which the solids constitute a very minor part of the liquid, which comprise a container having a main liquid confining surface declining progressively to and terminating in a small, confining area, a planchet removably disposed across said confining area and receiving and holding all liquid deposited on said main confining surface and draining into said small confining area, said main liquid confining surface being of a material substantially non-wettable by the liquid whereby when the liquid is disposed on said main confining surface and such deposited liquid is progressively evaporated from such surface, the unevaporated remaining liquid will progressively drain upon said removable planchet and carry with it all solids contained in the deposited liquid, until all of the liquid is evaporated, and then the planchet can be removed and the concentrated solids examined.

9. The method of concentrating on a planchet and examining the solids content distributed in a liquid that can be exaporated and which is many times the volume that can be borne by the planchet, which comprises confining a known quantity of the liquid and solids contained therein, progressively evaporating said quantity of liquid, and during such evaporation progressively directing the unevaporated part of the liquid, by a confining surface substantially non-wettable by said liquid, toward the planchet from which final evaporation of the liquid occurs, and then examining the concentrated solids on said small area.

10. The method of concentrating on a planchet and examining the solids content in a vaporizable liquid carrier which is many times the volume that can be borne by the planchet, which comprises progressively evaporating a measured quantity of such liquid upon a liquid confining surface that is substantially non-wettable by said liquid, and during such evaporation directing the diminishing but unevaporated remainder of the measured quantity of liquid onto the planchet, continuing the evaporation until the liquid is fully evaporated from said planchet, leaving said solids content concentrated and deposited on said planchet, and then removing said planchet with the concentrated solids thereon and examining said solids.

11. The method of monitoring a water supply for unsafe levels of radioactive contamination comprising preparing measured samples of different weights of a selected radioactive solid representative of the contaminant the water may be expected to collect, dispersing each of said measured samples in separate measured quantities of the water supply to be monitored when substantially free of radioactivity to provide samples of various selected percentage concentrations of the radioactive contaminant in the water, then progressively evaporating each water sample containing the measured contaminant individually upon a liquid confining surface that is substantially non-wettable by water and during such evaporation directing the diminished but unevaporated remainder of the sample onto a selected small local area separable from the remainder of the confining surface, from which final evaporation of the liquid occurs, then measuring the radioactivity of the concentrated solids of each of the water samples, then obtaining the solids from water samples obtained for monitoring purposes by the same method as the solids were obtained from said prepared water samples, measuring the radioactivity in the monitoring samples, and comparing the radioactivity in the solids obtained from each of the monitoring samples against the radioactivity of the solids obtained from each of the prepared samples for determining the quantity of the radioactive contaminant in each monitoring sample.

References Cited in the file of this patent

UNITED STATES PATENTS

| | | |
|---|---|---|
| 2,378,949 | Post | June 26, 1945 |
| 2,826,076 | Boretz et al. | Mar. 11, 1958 |
| 2,843,753 | Meeder | July 15, 1958 |
| 3,066,728 | Warner et al. | Dec. 4, 1962 |